United States Patent [19]

Ross, Sr.

[11] 4,258,835

[45] Mar. 31, 1981

[54] TROLLEY RAIL SECTION

[75] Inventor: Donald R. Ross, Sr., Pittsburgh, Pa.

[73] Assignee: U-S Safety Trolley Corporation, Pittsburgh, Pa.

[21] Appl. No.: 93,804

[22] Filed: Nov. 13, 1979

[51] Int. Cl.³ .............................................. B60M 1/34
[52] U.S. Cl. ..................................... 191/23 A; 191/30
[58] Field of Search .................. 191/23 A, 30, 31, 25, 191/44.1

[56] References Cited

U.S. PATENT DOCUMENTS

| 4,090,594 | 5/1978 | Ross ................................... 191/23 A |
| 4,106,599 | 8/1978 | Howell ............................... 191/23 A |

Primary Examiner—Richard A. Schacher
Attorney, Agent, or Firm—Brown, Flick & Peckham

[57] ABSTRACT

A trolley rail section is formed from a tubular housing that has a front side provided with laterally spaced slots extending lengthwise of the rail, and a partition wall extending across the inside of the housing and closing the inner sides of the slots, the side walls of which are provided with grooves receiving electrical conductor bars. The partition wall and the back of the housing have opposed openings therethrough, with each pair of openings communicating with a different one of the slots. Disposed in each partition wall opening and straddling the adjoining conductor bar is a U-shape metal clip with inturned free front edges overlapping the front of the bar. Disposed in the clip behind the bar is a metal plate that is pressed against the bar by set screws threaded in the back of the clip. A rigid metal conductor connection extends loosely through an opening in the back of the clip and is rigidly secured to the plate and provided with an abutment spaced rearwardly from the clip. Compressed between this abutment and the clip is a coil spring for moving the plate rearwardly away from the adjoining bar if the screws are retracted.

4 Claims, 4 Drawing Figures

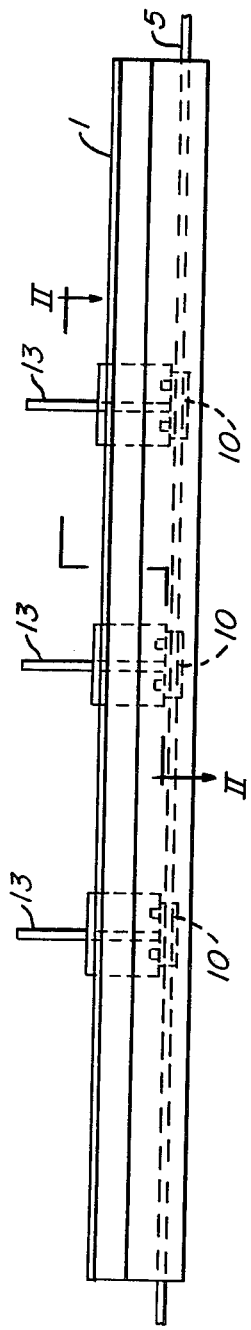
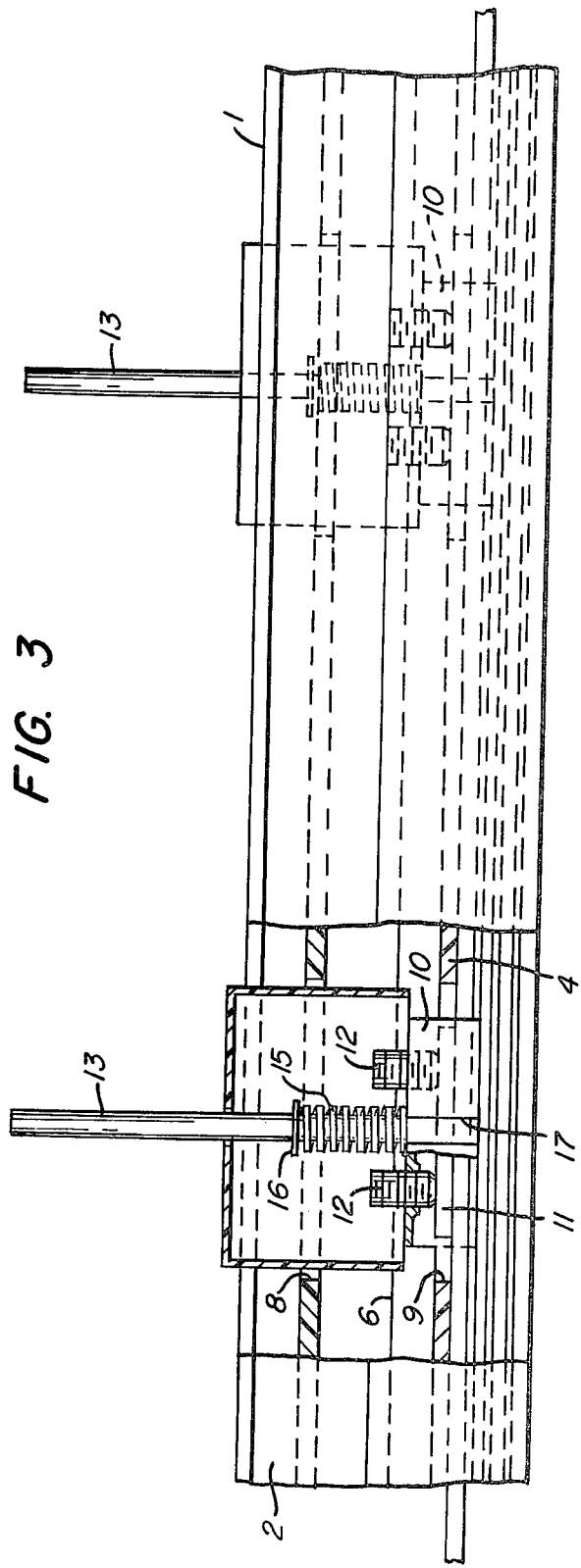

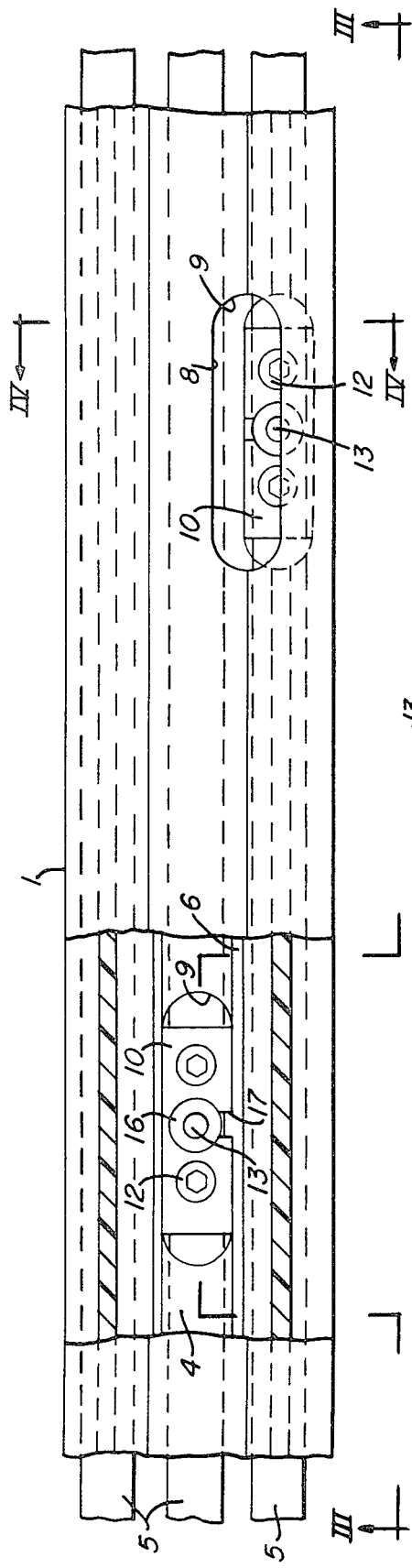
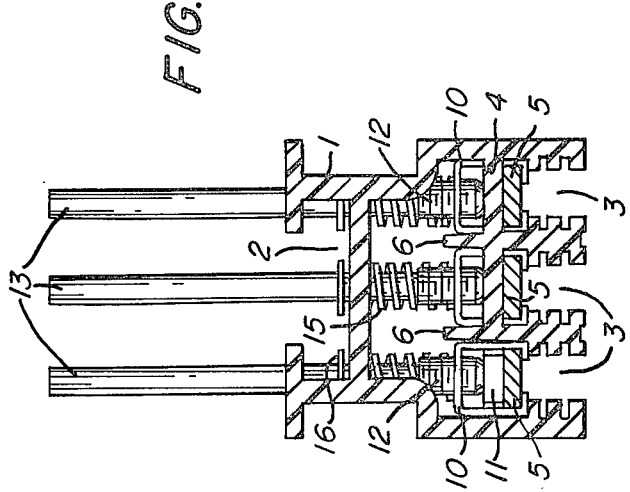

TROLLEY RAIL SECTION

A trolley rail of the type with which this invention is concerned is shown in U.S. Pat. No. 4,090,594. The rail includes longitudinal slots containing electrical conductor bars that extend through metal clips projecting into the slots. Also extending through each clip is the inner end portion of a copper strip that is pressed tightly against the adjoining bar by a set screw threaded in the back of the clip. Current is delivered to the bar through the copper strip. As disclosed in the patent, a good connection is made between the strip and bar, which are clamped between the set screw and the inturned edges of the clip. However to keep the inner end portion of the copper strip from preventing a conductor bar from being inserted in the clip, in practice the short projecting inner end of the copper strip has been bent up over the top of the clip while the screw is retracted, whereby to hold the strip as far away from the inturned edges of the clip as possible. Proper tightening of the set screw after the bar has been run through the clip will bend the strip down against the bar to make good electrical contact. In some instances, however, simply tightening the screw against the copper strip has misled workmen into thinking that a tight electrical connection has been made, when in fact, the strip has not been bent enough to bear tightly against the bar.

It is among the objects of this invention to provide an improvement on the above-mentioned U.S. Pat. No. 4,090,594 by providing a trolley rail construction in which conductor bars can easily be passed through the U-shape clips, and in which current-conducting members in the clips will always be pressed tightly against the bars when the set screws are tightened.

The preferred embodiment of the invention is illustrated in the accompanying drawings, in which:

FIG. 1 is a side view of a rail section;

FIG. 2 is an enlarged fragmentary plan view and section taken on the line II—II of FIG. 1;

FIG. 3 is a side view, partly in vertical section, taken on the line III—III of FIG. 2; and FIG. 4 is a vertical cross section taken on the line IV—IV of FIG. 2.

Referring to FIGS. 1 to 4 of the drawings, a rigid housing 1 of any desired length is extruded from a suitable plastic. High impact polyvinyl chloride is satisfactory. The housing has a generally rectangular outline in cross section and is tubular to reduce its weight and to provide a duct for wires and liquid conduits and for other purposes if desired. This housing is connected end-to-end with other like housing sections of any desired length to form a trolley rail, especially for travelling cranes.

In order to fasten housing 1 to a support beside it or above it, the back or top of the housing may be provided with a channel 2 (FIG. 4) extending lengthwise of it for receiving supporting members as shown in U.S. Pat. No. 4,090,594. The bottom or front side of the rail housing, depending on how the rail is mounted, is provided with parallel slots 3 extending lengthwise of it. There are at least two of these slots and usually three or more as shown in FIG. 4. The inner sides of the slots opposite their open sides are closed by a longitudinal partition wall 4 that extends across them and forms the floor or lower wall of the tubular portion of the housing. Disposed in each of the slots 3 directly beneath the partition wall is a metal conductor bar 5, the edges of which extend into grooves in the inner sides of the slot side walls to retain the bar in place. The bars can be inserted in the grooves from either end of the housing. The back of partition wall 4 may be provided with rearwardly projecting longitudinal ribs 6 that strengthen the wall.

The conductor bars are engaged by current pickup members (not shown) that extend into the slots and are movable along them. These may be trolley wheels or sliding shoes supported in any suitable manner. The pickup members are electrically connected to conductors, by which current is carried away from them. The conductor bars of one housing section may be connected with the bars in the next section in any suitable manner, or they may extend continuously from one end of the rail to the other end.

Suitable electric power connections generally are made to the conductor bars 5 at the ends of the rail for delivering electric current to them. On the other hand, the main connections can be made to the bars between the ends of a rail section, or electrical taps can be made in the same manner without altering the bars in any way. The rail section disclosed herein for that purpose will be inserted in a rail wherever electrical connections to the bars are to be made. All of the rail sections have the same construction, except that the tap-in housing shown is provided with certain openings. Thus, as shown in FIGS. 2 and 3, the back side or top of the housing and the partition wall inside are provided with a pair of opposed or more or less aligned openings 8 and 9, respectively, communicating with each bar-receiving slot 3. These openings extend lengthwise of the housing for a short distance.

Disposed in each partition wall opening 9 is a substantially U-shape metal clip 10 that straddles the adjoining metal conducting bar. This clip has a back and substantially parallel sides, with inturned free front or lower edges located beneath the bar. It is a feature of this invention that inside the clip behind or above the bar there is a separate flat metal plate 11. The back of the clip is provided near its ends with a pair of threaded openings, in each of which there is a set screw 12 that is accessible through the opening 8 in the rear or upper wall of the rail housing. When these screws are screwed downwardly they press plate 11 against the underlying bar, which thereby is clamped against the inturned edges of the clip. To hold the plate in the clip before a conductor bar is passed through the clip, and also to bring electric current to the plate, the clip is provided in its back with a central opening through which a rigid metal conductor connection, preferably in the form of a copper rod 13, extends. The inner or front end of this rod is secured to the plate by soldering or some other convenient means. The rod is long enough to extend out of the back or top of the rail so that a conductor from a power supply can be attached to it after the rail has been installed.

When the clips are first inserted in the rail, their set screws are retracted to their uppermost position. This permits the plate 11 in each clip to be held by a spring close to the back of the clip so that it will not interfere in any way with insertion of a conductor bar through the clip. The spring is a coil spring 15 encircling the copper rod and compressed between the back of the clip and an abutment 16 on the rod a short distance above the clip. Such an abutment can be formed in any suitable manner, such as by a spring ring that grips the rod. After a conductor bar has been passed through a clip the set screws are turned down against the slight resistance of this spring. Since the plate 11, against which the screws press, is freely movable, it will not offer any noticeable resistance to turning of the screws until it engages the bar. Then the workman will know by the increasing difficulty in turning the screws that the plate has engaged the bar and is tightly engaging it for good electrical contact.

In order to permit plate 11 and rod 13 to be assembled with the clip before being put into use, the rod-receiving opening in the back of the clip is formed by the inner end of a slot 17 that extends outwardly toward one side of the clip and then down through that side and its adjoining inturned front edges. This slot permits assembly by insertion of the plate edgewise into the clip while the rod is being moved laterally into the outer end of the clip slot. During this first step of the assembly the clip end of the coil spring is held back so that it will not interfere with insertion of the rod in the slot. As soon as the rod enters the slot, the spring is released against the side of the clip. The second step of the assembly consists in swinging the rod around into the inner end of the clip slot, which of course, simultaneously turns the plate into operative position substantially parallel to the back of the clip. The clip then is ready to be inserted in the rail housing, using the rod as a handle.

The clip that is to be connected to the center conductor bar is moved straight down through the openings above the center slot 3 in the housing, but each clip that is to connect with one of the side conductor bars is moved down through the upper opening 8 and then the rod is tilted toward the center of the housing in order to turn the clip so that it can enter the lower opening 9. Once in that opening, the clip will straighten up and the rod will extend more or less vertically above the rail.

It is desirable to close each upper opening 8 by means of an insulating sleeve 19 shown in FIGS. 1 and 3 but omitted from the other figures. The upper end of the sleeve is closed by an integral upper wall provided with a central opening, through which rod 13 extends. The sleeve extends down into housing 1 and rests on the underlying clip 10.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A trolley rail comprising a tubular housing formed of insulating material and having a front side provided with parallel laterally spaced walls forming therebetween parallel slots extending lengthwise of the housing for receiving current pick-up members movable lengthwise of the rail, a partition wall extending across the inside of the tubular housing and closing the inner sides of the slots, the opposite side walls of each slot being provided beside said partition wall with a pair of opposed grooves extending lengthwise thereof, electrical conductor bars in said slots with the edges of the bars retained in the pairs of grooves therein, said partition wall and the back side of the housing having pairs of opposed openings therethrough, each pair of openings opening into the inner side of a different one of the slots, a substantially U-shape metal clip disposed in each partition wall opening and straddling the adjoining conductor bar, each clip having a back and substantially parallel sides with inturned free front edges in front of said bar, a metal plate disposed in the clip behind the bar, set screws threaded in the back of the clip and pressing said plate against the bar to clamp it against said inturned edges, the clip having an opening in its back, a rigid metal conductor connection extending loosely through said clip opening with its front end rigidly secured to said plate, said conductor connection being provided with an abutment spaced rearwardly from the clip, and a coil spring encircling the conductor connection between said abutment and clip and compressed between them for moving said plate rearwardly away from the adjoining bar if said screws are retracted.

2. A trolley rail section according to claim 1, in which said clip opening is formed by the inner end of a slot extending out to one side of the clip and then forward through that side and its adjoining inturned front edge, whereby to permit assembly of the plate and conductor connection with the clip by inserting the plate edgewise into the clip while moving the conductor connection laterally of itself into the outer end of the clip slot and then swinging it around into the inner end of the slot to turn the plate into a position substantially parallel to the back of the clip.

3. A trolley rail section according to claim 2, in which said clip slot is substantially midway between the ends of the clip, and said set screws are located at opposite sides of the slot between it and said clip ends.

4. A trolley rail section according to claim 1, including an insulating sleeve extending forward through each of said openings in the back side of the housing, the outer end of the sleeve being closed by an end wall provided with a central opening snugly receiving the rigid metal conductor connection surrounded by the sleeve.

* * * * *